Figure 5:
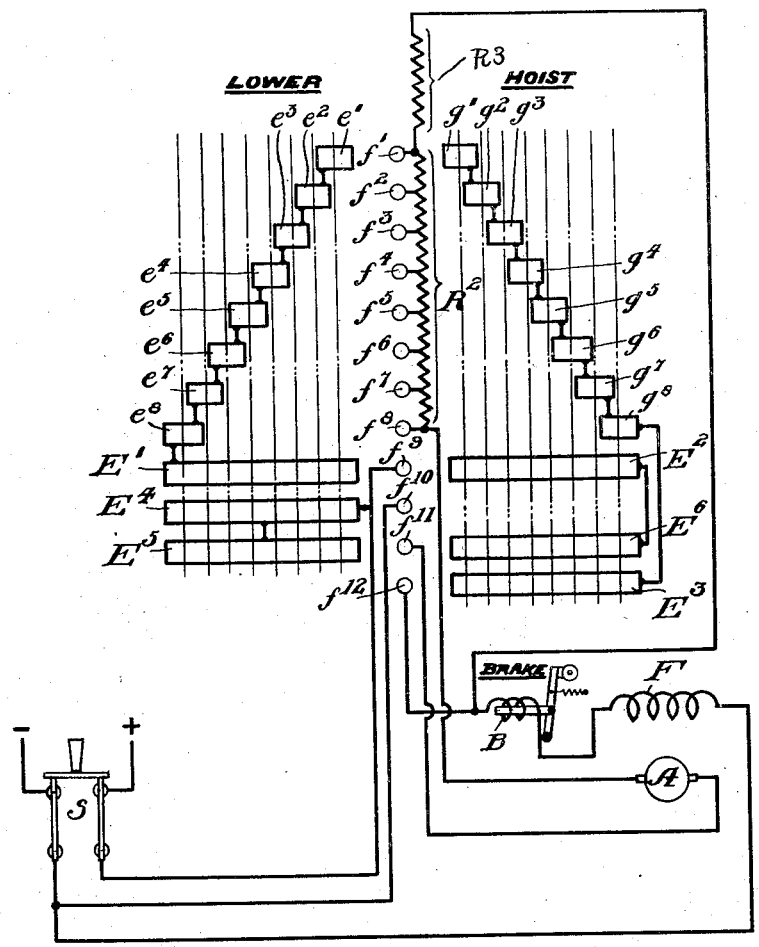

A. C. EASTWOOD.
METHOD OF AND MEANS FOR CONTROLLING ELECTRIC MOTORS.
APPLICATION FILED FEB. 8, 1910.
1,000,161.
Patented Aug. 8, 1911.
2 SHEETS—SHEET 1.
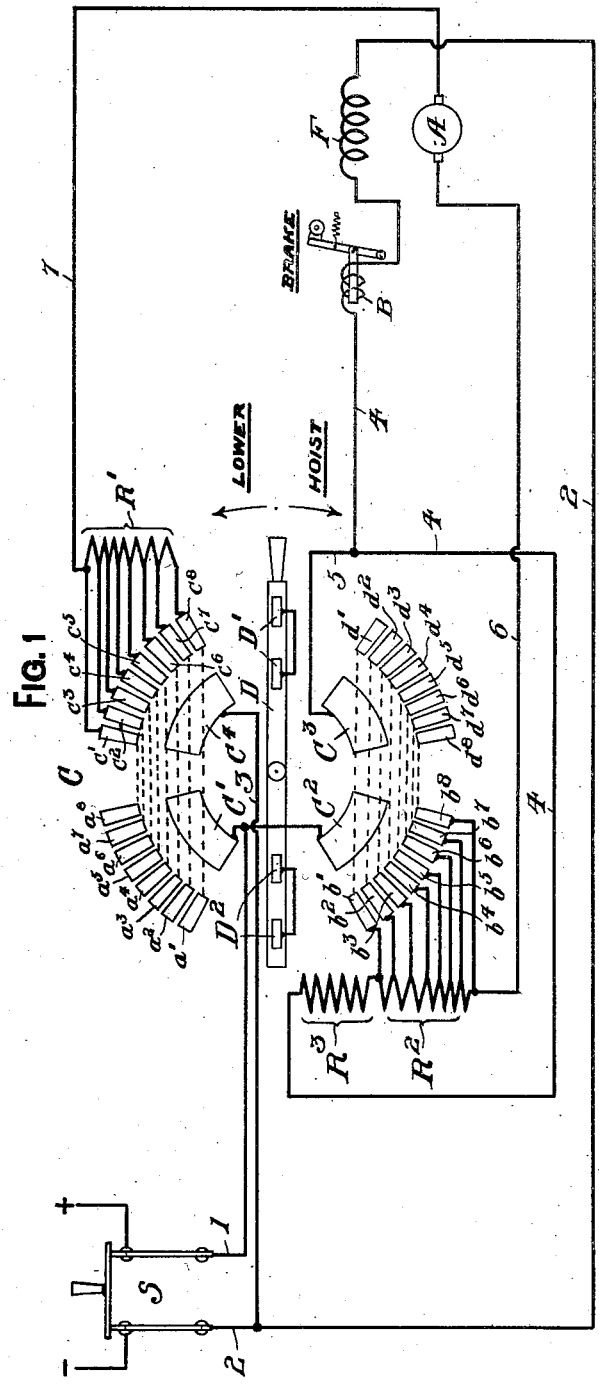
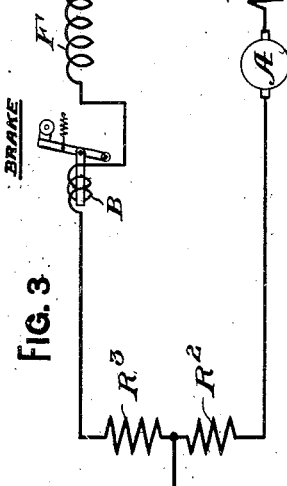
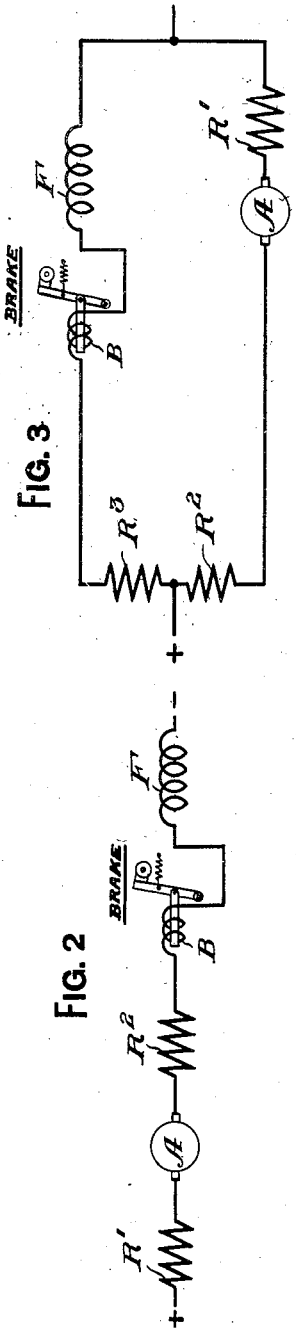
WITNESSES
INVENTOR:
A. C. Eastwood,
by F. N. Barber,
His attorney.

A. C. EASTWOOD.
METHOD OF AND MEANS FOR CONTROLLING ELECTRIC MOTORS.
APPLICATION FILED FEB. 8, 1910.

1,000,161.

Patented Aug. 8, 1911.
2 SHEETS—SHEET 2.

WITNESSES

INVENTOR

UNITED STATES PATENT OFFICE.

ARTHUR C. EASTWOOD, OF CLEVELAND, OHIO, ASSIGNOR TO THE ELECTRIC CONTROLLER AND MANUFACTURING COMPANY, OF CLEVELAND, OHIO, A CORPORATION OF OHIO.

METHOD OF AND MEANS FOR CONTROLLING ELECTRIC MOTORS.

1,000,161.  Specification of Letters Patent.  Patented Aug. 8, 1911.

Application filed February 8, 1910. Serial No. 542,736.

*To all whom it may concern:*

Be it known that I, ARTHUR C. EASTWOOD, a citizen of the United States, residing at Cleveland, in the county of Cuyahoga and State of Ohio, have invented or discovered new and useful Improvements in Methods of and Means for Controlling Electric Motors, of which the following is a specification.

My invention relates to a method of and means for controlling electric motors, with special reference to series wound motors used for driving electric hoists. In using the term "electric hoists" I do not wish to limit myself to elevators, or hoists working vertically or directly against gravity, but intend to include all applications of series wound motors in which the load in one direction of rotation of the motor is in excess of the load in the other direction. In describing my invention I will, however, describe it in connection with an electric hoist to which it is particularly applicable.

A series wound motor possesses the characteristic of varying its speed with the load, the speed increasing as the load decreases, and automatically decreasing as the load increases. For hoisting loads against gravity this characteristic is a valuable one, since light loads may be handled with celerity and the motor slows down when the hoist is heavily loaded, thereby avoiding excessive demands for power. The speed characteristic of the series wound motor, however, is seriously disadvantageous when applied to the lowering of a load, since the load on the motor may be a negative one, which will permit the motor to very promptly attain a dangerous speed.

On account of the advantageous characteristics of the series motor for hoisting varying loads it has for years been most commonly used for driving cranes and other hoists, and a vast amount of labor has been expended in devising means for compensating for the undesirable characteristics of the motor in lowering the load.

The means most commonly in use at the present time for limiting the speed of the load in lowering consists of what is known as a "mechanical brake". This brake is so constructed that it is impossible for the load to drive the motor backward, that is to say, the brake is compelled to absorb by friction all of the net energy generated by the motion tor tends to attain a speed higher than that which corresponds to the speed at which the brake is set.

Since the mechanical brake must absorb the net energy of the lowering load as friction and dissipate it as heat, it is evident that when heavy loads must be lowered at frequent intervals, frictional wear and heating may become excessive. The control of the speed of lowering is usually uncertain, and frequently a pumping action is set up which is undesirable and in many cases dangerous.

The principal object of my invention is to provide a method of and a means for controlling a series wound motor, in connection with an electric hoist, of such a nature that the desirable characteristics of the series wound motor in hoisting varying loads will be retained and its disadvantageous characteristics in the lowering of loads will be obviated.

By means of my invention the necessity of a mechanical brake of the character above described is obviated. The elimination of the mechanical brake eliminates what has been in general a complicated and troublesome device.

My invention also provides for fully as reliable control of the speed in lowering as may be obtained in hoisting; limits the speed of the motor to a predetermined maximum whether the load being lowered be light or heavy; permits of a maximum safe speed in lowering any load from zero to the maximum for which the hoist is designed; and provides features of safety, simplicity, convenience, cheapness, and other advantages which will be apparent to those skilled in the art.

In carrying out my invention I provide a controller which when operated to hoist the load connects the motor with its armature and field in series, the speed of hoisting being regulated by a variable resistance in series with the motor in the well known way.

In lowering the load I connect the armature and series field winding in separate circuits with variable resistance in the circuits. On the first point, or step of the controller on the lowering side the resistance in the field circuit is sufficient to limit the current in the field to a safe value, and minimum lowering speed is secured on the of the load downward, and also to throw a friction load on the motor whenever the mofirst point. On the first point or step of the controller on the lowering side the resistance in the armature circuit is at a maximum, and on succeeding steps (to secure higher speeds of lowering) I increase the resistance in the field circuit and decrease the resistance in the armature circuit until at full speed the motor is operating with minimum safe field strength and with its armature connected directly across the supply mains.

The electrical actions which take place in the motor depend upon the load. In the case of a light load which is not of itself sufficient to overcome the friction of the hoisting mechanism, the motor acts as a separately excited motor, the maximum speed being determined by the extent to which the field is weakened. I find it perfectly safe and feasible to make the maximum motor speed in lowering from two to two and one-half times the normal full load hoisting speed. When this maximum speed is once determined by adjustment of the resistance in the field circuit it cannot be exceeded since the motor has the characteristics of a shunt wound motor.

In the case of heavy loads they will be started down by power, thus giving an acceleration higher than would result from gravity alone. As soon as the armature attains a certain speed it will begin to return power to the line. The speed at which this takes place depends, first, upon the resistance of the armature circuit, the speed decreasing as the armature resistance is decreased and second, upon the field current, the speed increasing as the field current is decreased.

The arrangement of my controller appears somewhat anomalous since moving the controller from the first lowering position toward succeeding lowering positions cuts out resistance from the armature circuit, which tends to decrease the speed and cuts resistance into the field circuit, which tends to increase the speed. As a matter of fact, however, weakening the field strength by inserting resistance in the field circuit has a much greater effect in increasing the speed than reducing the resistance in the armature circuit had in decreasing the speed. Consequently the first lowering point of the controller gives minimum speed and the last point gives maximum speed, which is the most desirable arrangement.

The maximum speed in lowering the maximum load is also limited. Under the condition of maximum speed the armature is connected directly to the supply mains and the net energy delivered by the lowering load is returned to the line. A steady speed is reached as soon as the torque set up by the motor (acting as a generator) balances the torque of the load on the motor.

Having described my invention in general terms, I will now describe it more in detail, reference being had to the accompanying drawings, in which—

Figure 4:
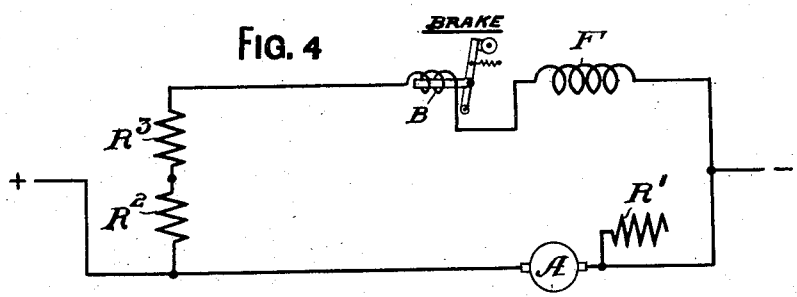

Figure 1 is a diagram of my invention, in connection with a controller of the well known dinkey type; Fig. 2, a simplified diagram showing the connections of the motor on the first hoisting point of Fig. 1; Fig. 3, a simplified diagram corresponding to the first lowering point in Fig. 1; Fig. 4, a simplified diagram corresponding to the last lowering point in Fig. 1; and Fig. 5, a diagram of electrical connections of my invention, using a controller of the "drum type."

Referring now to Fig. 1, A is the armature of the electric motor to be controlled; F, the series field winding of the motor; and B, the winding of the magnetic brake of any well known construction in which the brake is applied by means of a weight or a spring, and is released when current flows through the winding B. C is the controller by means of which the motor may be started and stopped, and its speed controlled in either direction of rotation. S is a switch which connects the motor and controller to a source of current supply.

The controller indicated at C is, in general, similar to the well known dinkey controller, and comprises four inner segmental rings marked $C'$, $C^2$, $C^3$, and $C^4$, respectively, together with four sets of outer segments arranged concentrically with the said inner rings, these outer segments being marked $a'$ to $a^8$, $b'$ to $b^8$, $c'$ to $c^8$, and $d'$ to $d^8$, respectively. Corresponding segments are cross connected, the segment $a'$ being connected to segment $c^8$, $a^2$ to $c^7$, etc. and the segment $b'$ being connected to the segment $d'$, $b^2$ to $d^2$, etc. The controller is provided with the switch arm D which carries at its opposite ends connected brushes $D'$ and connected brushes $D^2$, each adapted to make contact with one of the inner rings, connecting it selectively to the outer contact segments.

To hoist the load, the arm D of the controller is moved in such a direction that the brushes $D'$ connect the ring $C^3$ to the segment $d'$, and the brushes $D^2$ connect the ring C' to the segment $a'$. The circuit through the motor is then as follows: from the positive side of the switch S through the wire 1, the ring C', the brushes $D^2$, the segment $a'$, the cross connection to segment $c^8$, the entire resistance R', the wire 7, the armature A, the wire 6, the entire resistance $R^2$, the cross connection to segment $d'$, the brushes D', the ring $C^3$, the wire 5, the wire 4, the winding of the brake B, the series field F, and the wire 2 to the negative side of the switch S. The brake B is released and the motor starts in the hoisting direction with the entire resistance R' and $R^2$ in series with its windings, as indicated in Fig. 2. As the arm of the controller is moved clockwise toward the full speed position, the resistances R' and $R^2$ are cut out step by step until, when the brushes D' connect the segment $d^8$ with the ring $C^3$, and brushes $D^2$ connect the segment $a^8$ with the ring C', all of the resistance is cut out. The motor will then operate at full speed in the hoisting direction.

To lower the load, the controller arm D is moved in the opposite or anti-clockwise direction from the off-position so that the brushes D' connect the ring $C^4$ with the segment $c^8$, while the brushes $D^2$ connect the ring $C^2$ with the segment $b'$. Current then flows through the motor as follows: from the positive side of the switch S through the wire 1, the ring $C^2$, the brushes $D^2$, the contact $b'$, at which point the current divides, one path being through the resistance $R^3$, the wire 4, the winding of the brake B, the series field F, and the wire 2 to the negative side of the switch S; the other path being from the segment $b'$ through the resistance $R^2$, the wire 6, the armature A in the opposite direction to that which occurred in hoisting the wire 7, the resistance R', the segment $c^8$, the brushes D', the ring $C^4$, and the wire 3 to the negative side of the switch S. As the arm of the controller is moved toward the full speed lowering position, the resistances R' and $R^2$ are removed from the armature circuit step by step, the circuit through the armature being as follows: from the positive side of the switch S through the wire 1, the ring $C^2$, the brushes $D^2$, the segment $b^8$, the wire 6, the armature A, the wire 7, the segment $c'$, the brushes D', the ring $C^4$, and the wire 3 to the negative side of the switch S. At the same time that the resistance $R^2$ is being removed from the armature circuit, it is being inserted in the field circuit until in the full speed position the circuit through the field of the motor is as follows: from the positive side of the switch S through the wire 1, the ring $C^2$, the brushes $D^2$, the segment $b^8$, the entire resistance $R^2$, the resistance $R^3$, the wire 4, the brake winding B, the series field F, and the wire 2 to the negative side of the switch S.

Fig. 3 shows in simplified form the connections of the motor on the first lowering point of the controller with the resistances $R^2$ and R' in series with the armature, and the resistance $R^3$ in series with the field, while Fig. 4 shows the connections when the controller is on the last, or highest speed lowering point with the resistance entirely cut out of the armature circuit, and the resistances $R^2$ and $R^3$ in series with the field.

It will be observed that in the full speed lowering position the entire resistance $R^2$, together with the resistance $R^3$, is in series with the field of the motor. This serves to give a high speed of lowering, and at the same time reduces the current drawn from the line, and also reduces the heating of the field windings of the motor.

Referring now to Fig. 5, my invention is shown in connection with a drum type controller, the mode of control being entirely similar to that described in connection with Fig. 1. In Fig. 5, $e'$ to $e^8$ and $g'$ to $g^8$ are contact strips mounted on the rotatable drum of the controller K and arranged to coöperate with the stationary contact fingers $f'$ to $f^8$, while E' to $E^6$ are contact rings similarly mounted on the drum of the controller and arranged to make contact with stationary fingers $f^9$ to $f^{12}$. $R^2$ is a resistance controlled by the fingers $f'$ to $f^8$, and the strips $e'$ to $e^8$, or $g'$ to $g^8$, according as the drum of the controller is revolved in one or the other direction from the off position.

When the drum of the controller is moved to the first point in the hoisting direction, that is to say with contact strip $g'$ in contact with the finger $f'$, and the contact rings $E^2$, $E^3$, and $E^6$ in contact with fingers $f^9$, $f^{12}$, and $f^{11}$, respectively, the circuit through the motor is as follows: from the positive side of the switch S through the contact finger $f^9$, the ring $E^2$, the ring $E^6$, the contact finger $f^{11}$, the armature A of the motor, the entire resistance $R^2$, the contact finger $f'$, the contact strip $g'$, the connections on the drum of the controller, the ring $E^3$, the contact finger $f^{12}$, the winding B of the brake, and the series field F to the negative side of the switch S. As the drum of the controller is moved farther in the hoisting direction the resistance $R^2$ is gradually cut out of the motor circuit until, when the contact strip $g^8$ makes contact with the contact finger $f^8$, all the resistance $R^2$ is cut out and the motor operates at full speed in the hoisting direction as a series wound motor. It is to be noted that during hoisting the resistance $R^3$ is short circuited. In the first position of the controller for lowering the circuits are as follows: from the positive side of the switch S through the contact finger $f^9$, the ring E', the connections on the drum of the controller, the strip $e'$, the contact finger $f'$, at which point the current divides, one path being through the supplementary resistance $R^3$, the winding B of the brake, and the series field F to the negative side of the switch S, the other path being from the contact finger $f'$ through the entire resistance $R^2$, the armature A, the contact finger $f^{11}$, the ring $E^5$, the ring $E^4$, and the contact $f^{10}$ to the negative side of the switch S. As the drum of the controller is moved farther from the off position, the resistance $R^2$ is removed from the armature circuit step by step and is included in the field circuit until, when the finger $f^8$ rests upon the contact $e^a$, the entire resistance $R^2$, as well as the resistance $R^3$, is in series with the field circuit, while the armature A is connected directly across the supply mains. Under this condition the motor will operate at maximum speed in the lowering direction whether it is acting as a motor, as will be the case with very light loads, or whether it is acting as a generator, as will be the case when it is overhauled or driven by heavier loads, as hereinbefore explained.

It will be noted that with either controller illustrated in Fig. 1 or that illustrated in Fig. 5, when the movable member of the controller is moved toward the off position when a load is being lowered, the speed of the load is checked due to the increased field strength of the motor. The speed of the lowering load may be very suddenly checked in this way and without damage to the motor, since under this condition the field strength of the motor is increased which gives the best condition for good commutation, and at the same time the resistance in the armature circuit is increased so that an undue rush of current in the armature circuit is prevented.

I do not desire to be limited to the precise combinations and details shown and described, but desire to include within my invention such modifications as come within the spirit thereof.

I claim—

1. The method of controlling a motor, having a series field winding which consists in connecting the armature and series field windings of the motor in series with each other and in series with a resistance, and reducing said resistance to increase the speed of the motor for one direction of motion, and connecting the armature and series field windings in parallel circuits, each containing a resistance, and increasing the resistance in the field circuit to increase the speed of the motor for the opposite direction of motion.

2. The method of controlling an electric motor having a series field winding which consists in connecting the armature and series field windings of the motor in series with each other and in series with a resistance, and reducing said resistance to increase the speed of the motor for one direction of motion, and connecting the armature and series field windings in parallel circuits, each containing a resistance, and increasing the resistance in the field circuit while reducing the resistance in the armature circuit to increase the speed of the motor for the opposite direction of motion.

3. The method of controlling the speed of a load lowered by a hoist driven by an electric motor which consists in connecting the field windings of the motor across the supply mains in series with a variable resistance, and connecting the armature across the supply mains, also in series with a resistance, and increasing the resistance in the circuit of the field winding to increase the speed of the motor acting as a motor under light loads, and to increase the speed of the motor acting as a generator under heavy loads.

4. In an electric controller having stationary contacts and movable contacts coöperating therewith, and connections between said contacts, a source of current supply, resistances, and an electric motor, having a series field winding such that when said movable contacts are moved in one direction from the off position the armature and series field windings of the motor are connected in series with each other and in series with a resistance which is reduced as the movable contacts are moved away from the off position, and when the movable contacts are moved in the opposite direction from the off position the series field windings of the motor are connected in series with a resistance across the supply mains, the armature being also connected in series with a resistance across the supply mains, and the resistance in the field circuit being increased, and the resistance in the armature circuit being reduced as the movable contacts are moved away from the off position.

5. In an electric controller for controlling the speed of an electric motor, the combination of fixed and movable contacts, a fixed resistance and a variable resistance controlled by the controller contacts, the connections being such that when the controller is operated to start the motor the armature of the motor is connected across the supply mains in series with said variable resistance, and the field windings of the motor are connected across the supply mains in series with said fixed resistance, and when the controller is operated to increase the speed of the motor, said variable resistance is simultaneously cut out of the armature circuit and cut into the field circuit.

6. In an electric controller for electric motors means for including the field in series with the armature and for placing the field and armature in parallel circuits, a resistance, and means for increasing resistance in the field circuit and simultaneously decreasing resistance in the armature circuit.

Signed at Cleveland, Ohio, this 17 day of Jan., A. D. 1910.

ARTHUR C. EASTWOOD.

Witnesses:
R. I. WRIGHT,
H. F. STRATTON.

---

Corrections in Letters Patent No. 1,000,161.

It is hereby certified that in Letters Patent No. 1,000,161, granted August 8, 1911, upon the application of Arthur C. Eastwood, of Cleveland, Ohio, for an improvement in "Methods of and Means for Controlling Electric Motors," errors appear in the printed specification requiring correction as follows: Page 1, after line 54, insert the words and syllable, *of the load downward, and also to throw a friction load on the motor whenever the mo-;* page 2, strike out lines 11 and 12; page 3, line 42, after the word "hoisting" insert a comma; and that the said Letters Patent should be read with these corrections therein that the same may conform to the record of the case in the Patent Office.

Signed and sealed this 10th day of October, A. D., 1911.

[SEAL.]

E. B. MOORE,

*Commissioner of Patents.*